(12) United States Patent
Nguyen

(10) Patent No.: US 7,296,092 B2
(45) Date of Patent: Nov. 13, 2007

(54) APPARATUS FOR INTER-DOMAIN COMMUNICATIONS INCLUDING A VIRTUAL SWITCH FOR ROUTING DATA PACKETS BETWEEN VIRTUAL INTERFACES OF THE VIRTUAL SWITCH

(75) Inventor: Tuyen Nguyen, San Ramon, CA (US)

(73) Assignee: Nokia, Inc., Irving, TX (US)

( * ) Notice: Subject to any disclaimer, the term of this patent is extended or adjusted under 35 U.S.C. 154(b) by 133 days.

(21) Appl. No.: 10/881,858

(22) Filed: Jun. 30, 2004

(65) Prior Publication Data
US 2006/0005185 A1 Jan. 5, 2006

(51) Int. Cl.
*G06F 13/00* (2006.01)

(52) U.S. Cl. .................................................. 709/249

(58) Field of Classification Search ................ None
See application file for complete search history.

(56) References Cited

U.S. PATENT DOCUMENTS

2002/0156612 A1* 10/2002 Schulter et al. ............... 703/23

* cited by examiner

*Primary Examiner*—Robert B Harrell
(74) *Attorney, Agent, or Firm*—Squire, Sanders & Dempsey L.L.P.

(57) ABSTRACT

An apparatus for a multi-domain computer system includes multiple virtual system domains, each having an associated, independent routing instance. A virtual switch is created to forward packets between the domains. The virtual switch is configured to operate substantially as if it were a physical layer-2 switch. The virtual switch and the virtual domains are connected together by virtual interfaces, where the virtual switch, the virtual domains, and the virtual interfaces are all created in software. Further, protocols such as ARP, IP, and/or IPv6 operate over the virtual interfaces in substantially the same way that they would over Ethernet. Also, each domain has a software driver that behaves like an Ethernet driver, and has a 48-bit Ethernet-like address that is used for the physical address.

19 Claims, 5 Drawing Sheets

APPARATUS FOR INTER-DOMAIN COMMUNICATIONS INCLUDING A VIRTUAL SWITCH FOR ROUTING DATA PACKETS BETWEEN VIRTUAL INTERFACES OF THE VIRTUAL SWITCH

FIELD OF THE INVENTION

The invention is related to computer networks, and in particular, to virtual switch that is configured to enable an inter-domain communication.

BACKGROUND OF THE INVENTION

A firewall is typically configured to prevent unauthorized access to or from a private network. The firewall may be arranged to the isolate the private network from the Internet by controlling access to resources within the private network. For example, the firewall may be configured to prevent unauthorized Internet users from accessing resources within the private network. Packets entering and leaving the private network may be forwarded to the firewall. The firewall may block packets that do not meet specified security criteria.

An organization may have several departments, with each department having its own firewall. Typically, packets sent to a host in a department are first sent to the firewall for that department before being routed to the destination host. Similarly, a packet sent from a host is generally sent to the firewall for the department to which the host belongs before being routed elsewhere. A packet may then be routed from the firewall to a gateway router. If the packet is destined for a host in another department within the organization, the packet may then be routed from the gateway router to the firewall for that department.

Embodiments of the invention generally provide a network device for inter-domain communications. The device may include a transceiver configured to transmit and receive packets over a network based, in part, on a network protocol. The device may further include a processor that is configured to create a virtual switch that is configured to receive a packet at one of a plurality of interfaces associated with the virtual switch, wherein the plurality of interfaces includes a plurality of virtual interfaces, and wherein the virtual switch is configured to be associated with at least three virtual interfaces, and to provide the packet at another of the plurality of interfaces.

Embodiments of the invention may further provide a computer program for inter-domain communications embodied on a computer-readable storage medium, the program including components that are configured to enable actions to be performed. The program may control actions that include configuring a processor to create a virtual switch that is configured to be associated with at least one of a plurality of interfaces that includes at least three virtual interfaces. Further, the program may control, if a packet is received by the virtual switch at one of the plurality of interfaces, employing the virtual switch to provide the packet to another of the plurality of interfaces.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The phrase "in one embodiment," as used herein does not necessarily refer to the same embodiment, although it may.

Briefly stated, the invention is related to an apparatus for a multi-domain computer system that includes multiple virtual system domains, each having an associated, independent routing instance. A virtual switch is created to forward packets between the domains. The virtual switch may be configured to operate substantially as if it were a physical layer-2 switch. The virtual switch and the virtual domains are connected together by virtual interfaces, where the virtual switch, the virtual domains, and the virtual interfaces may all be created in software. Further, protocols such as address resolution protocol (ARP), Internet Protocol (IP), and/or Internet Protocol version 6 (IPv6), and the like, may operate over the virtual interfaces in substantially the same way that they would over Ethernet. Also, each domain may include a software driver that behaves like an Ethernet driver, and has an Ethernet-like address that is used for the physical address. In one embodiment, the Ethernet-like address is a 48-bit address.

Figure 1:
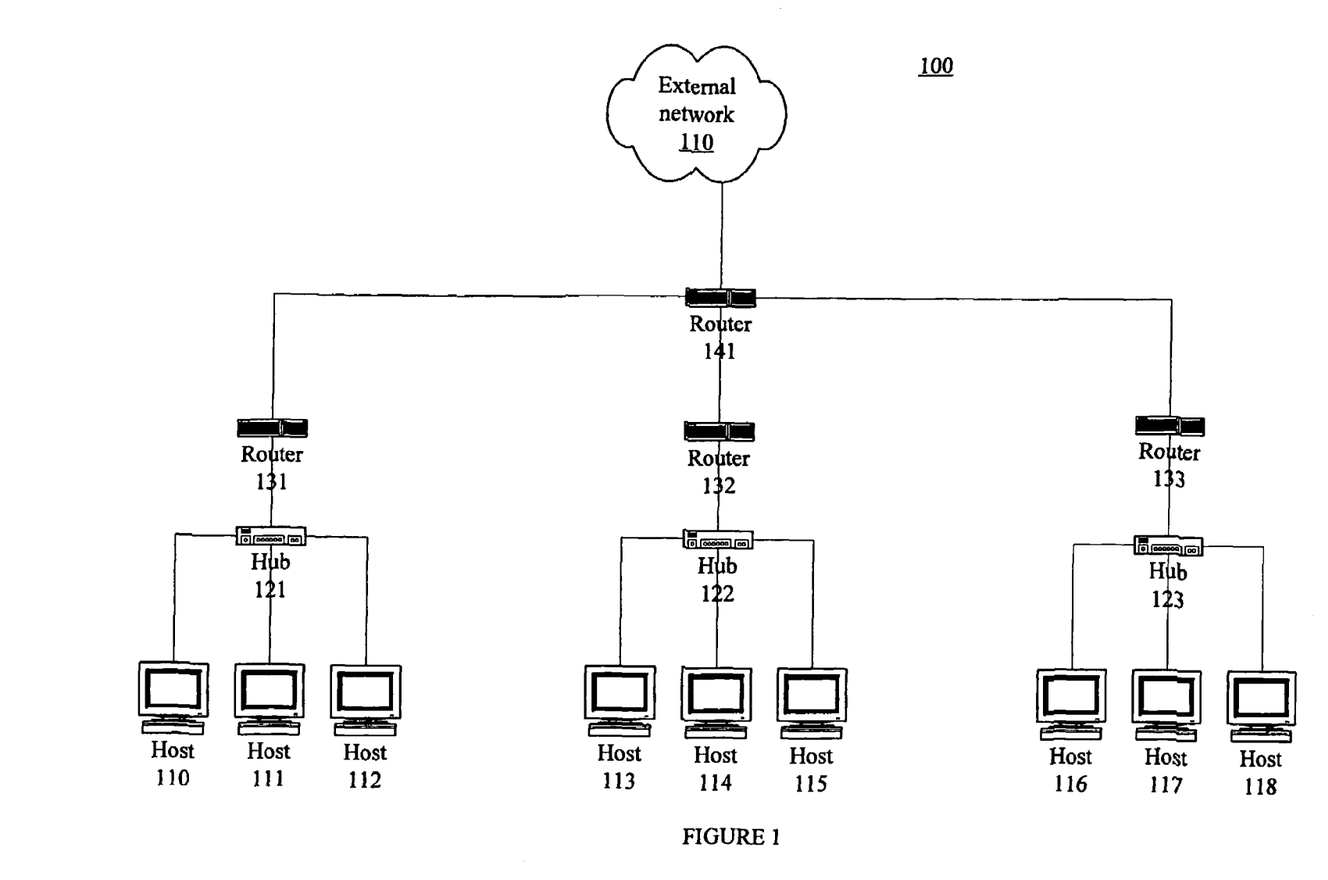
FIG. 1 illustrates a block diagram of a system for communicating over a network.

FIG. 1 illustrates a block diagram of system 100. System 100 includes host devices 110-118, hubs 121-123, routers 131-133 and 141, and external network 110. System 100 may include many more components than those which are shown in FIG. 1 for illustrative purposes.

Host devices 110-118 may each include virtually any computing device capable of connecting to another computing device to send and receive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, one or more of client devices 110-118 may be any device that is capable of connecting using a wired or wireless communication medium such as a PDA, POCKET PC, wearable computer, and any other device that is equipped to communicate over a wired and/or wireless communication medium.

Hubs 121-123 are network devices that are each arranged to provide a packet received at one if its adapter to each of its other adapters. Hubs 121-123 are optional elements in system 100, and may not be needed if another topology is employed for system 100.

Routers 131-133 and 141 are arranged to forward packets based on one or more network protocols, including but not limited to ARP, RARP, IP vX (e.g. IPv4, IPv6), and the like. Further, router 141 may be a gateway router. Also, routers 131-133 may each include a firewall. Each firewall may include one or more computing devices configured to shield a resource, such as a resource server, within a locally managed security perimeter from an undesired external access. Each firewall may be implemented as a filter, gateway, network address translator (NAT), and the like configured to minimize the undesired external accesses.

External network 110 may include virtually any external network, such as the Internet. Network 110 is enabled to employ any form of computer readable media for communicating information from one electronic device to another. Also, network 110 can include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 110 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices with various degrees of mobility. For example, network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. Furthermore, remote computers and other related electronic devices could be remotely connected to either LANs or WANs via a modem and temporary telephone link.

Additionally, network 110 may include communication media that typically embodies computer-readable instructions, data structures, program modules, or other data in a modulated data signal such as a carrier wave, data signal, or other transport mechanism and includes any information delivery media. By way of example, communication media includes wired media such as, but not limited to, twisted pair, coaxial cable, fiber optics, wave guides, and other wired media and wireless media such as, but not limited to, acoustic, RF, infrared, and other wireless media. System 100 may be employed by a business or private organization which may include several departments. For example, hosts 110-112 may be included in one department, hosts 113-115 may be included in another department, and hosts 116-118 may be included in yet another department. System 100 may include many more departments, hosts, routers, and other network elements than those shown in FIG. 1. System 100 may be employed for communications of hosts 110-118 with each other, with resources within system 100, and with external network 110. Also, router 131 may include a firewall for the department that includes hosts 110-112, router 132 may include a firewall for the department that includes hosts 113-115, and router 133 may include a firewall for the department that includes hosts 116-118. The firewalls may be employed for security purposes, and the like.

Figure 2:
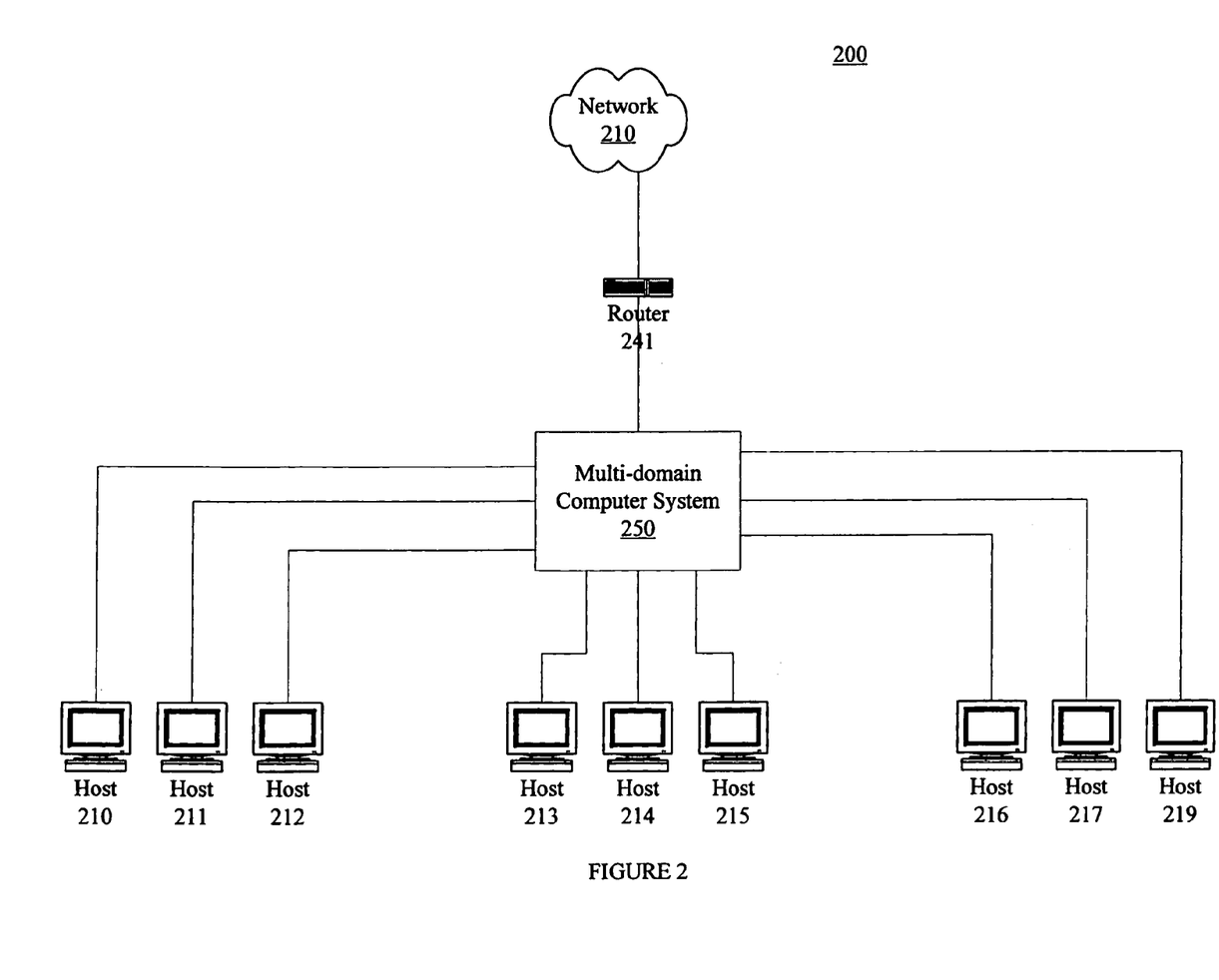
FIG. 2 shows a block diagram of another system for communicating over a network that includes a multi-domain computer system.

FIG. 2 shows a block diagram of system 200. Components in system 200 may operate in a similar manner to similarly-named components in system 100, and may operate in a different manner in some ways. System 200 further includes multi-domain computer system 250.

Embodiments of multi-domain computer system 250 are described in greater detail below. Briefly, however, multi-domain computer system 250 is a computer system that includes multiple virtual system domains, each having an associated, independent routing instance. The virtual system domains are also interchangeably referred to herein as "virtual network devices." Multi-domain computer system 250 may include virtually any number of virtual network devices, such as only a few virtual network devices, or hundreds or more virtual network devices.

By employing multi-domain computer system 250 instead of physical routers, firewalls, routing network devices, and the like, substantial hardware savings can be achieved. A large number of separate physical network devices may be replaced with multi-domain computer system 250. The virtual network devices act substantially as if they were physical network devices and may employ the same protocols, but are implemented in software within multi-domain computer system 250.

Figure 3:
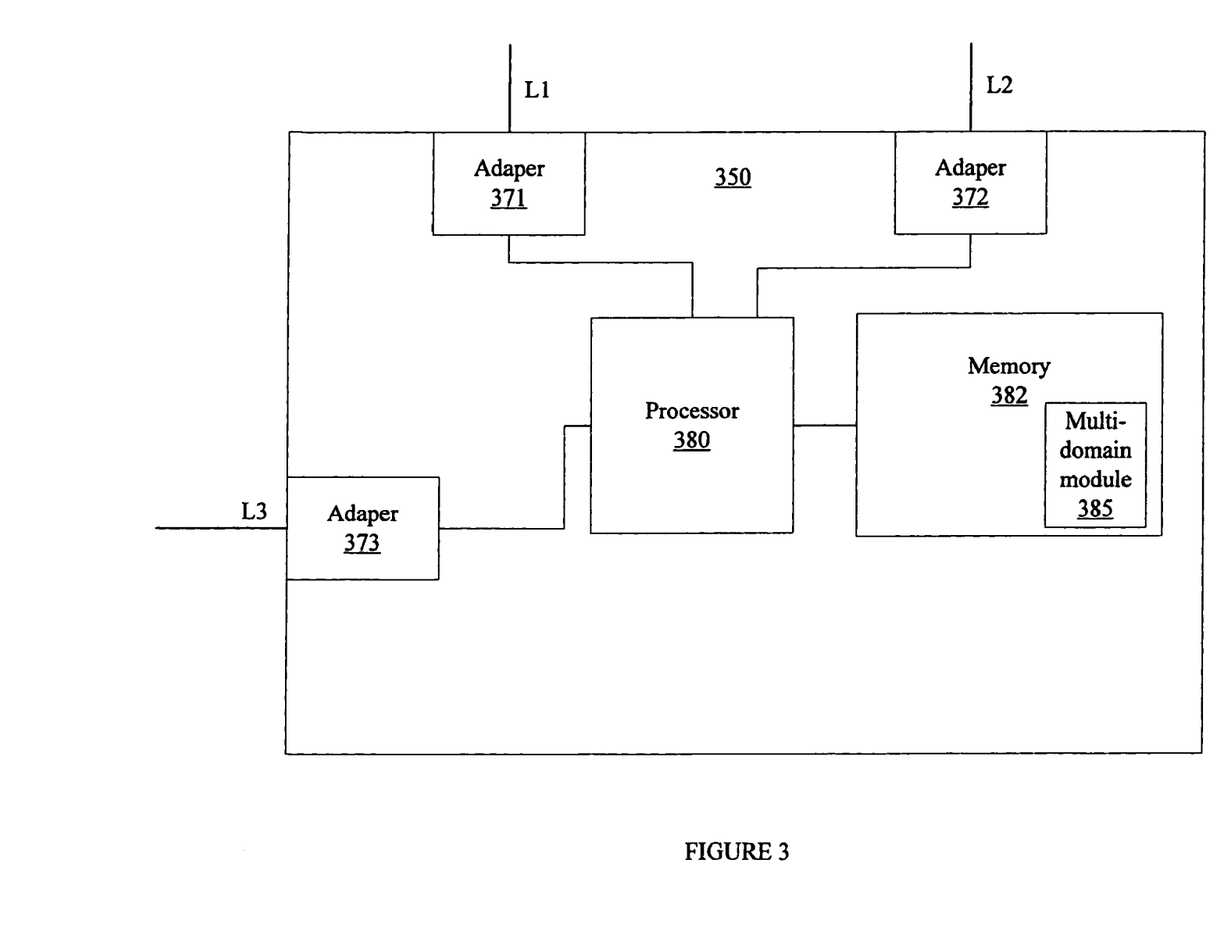
FIG. 3 illustrates a block diagram of an embodiment of a multi-domain computer system.

FIG. 3 illustrates a block diagram of an embodiment of multi-domain computer system 350. Multi-domain computer system 350 may operate in a substantially similar manner as described for multi-domain computer system 250 of FIG. 2, and may operate in a different manner in some ways. Multi-domain computer-system 350 includes adapters 371-373, processor 380, and memory 382. Memory 382 includes programs such as multi-domain module 385. Adapters 371-373 may be coupled to physical interfaces L1-L3, respectively. Multi-domain computer system 350 may include many more components than those shown. The components shown, however, are sufficient to disclose an illustrative embodiment for practicing the invention.

Memory 382 may include a mass memory which may include RAM, ROM, and one or more permanent mass storage devices, such as a hard disk drive and the like. The mass memory may store software programs that include code segments and the like. The software programs stored in memory 382 may include multi-domain module 385. In one embodiment, multi-domain module 385 is a single program. In another embodiment, multi-domain module 385 includes multiple programs that operate independently of each other. In any case, multi-domain module 385 may include code segments for creating virtual network devices, virtual interfaces, and a virtual switch, and for performing the functionality of the created virtual network devices, virtual interfaces, and virtual switch, as explained in greater detail below.

Processor 380 may be configured to perform actions, including fetching and decoding code segments from software programs such as multi-domain module 385 in memory 380. Processor 380 may be further configured to communicate with adapters 371-373.

Adapters 371-373 are configured to transmit and receive packets over a network. An adapter is sometimes known as a transceiver, transceiving device, driver, or network interface.

When fetched and decoded by processor 380, multi-domain module 385 is configured to create virtual network devices, and to provide communication between the virtual network devices. Multi-domain module 385 may also be arranged for to provide communication between the virtual network devices and a physical network through communication with one or more adapters, such as adapters 371-373.

Figure 4:
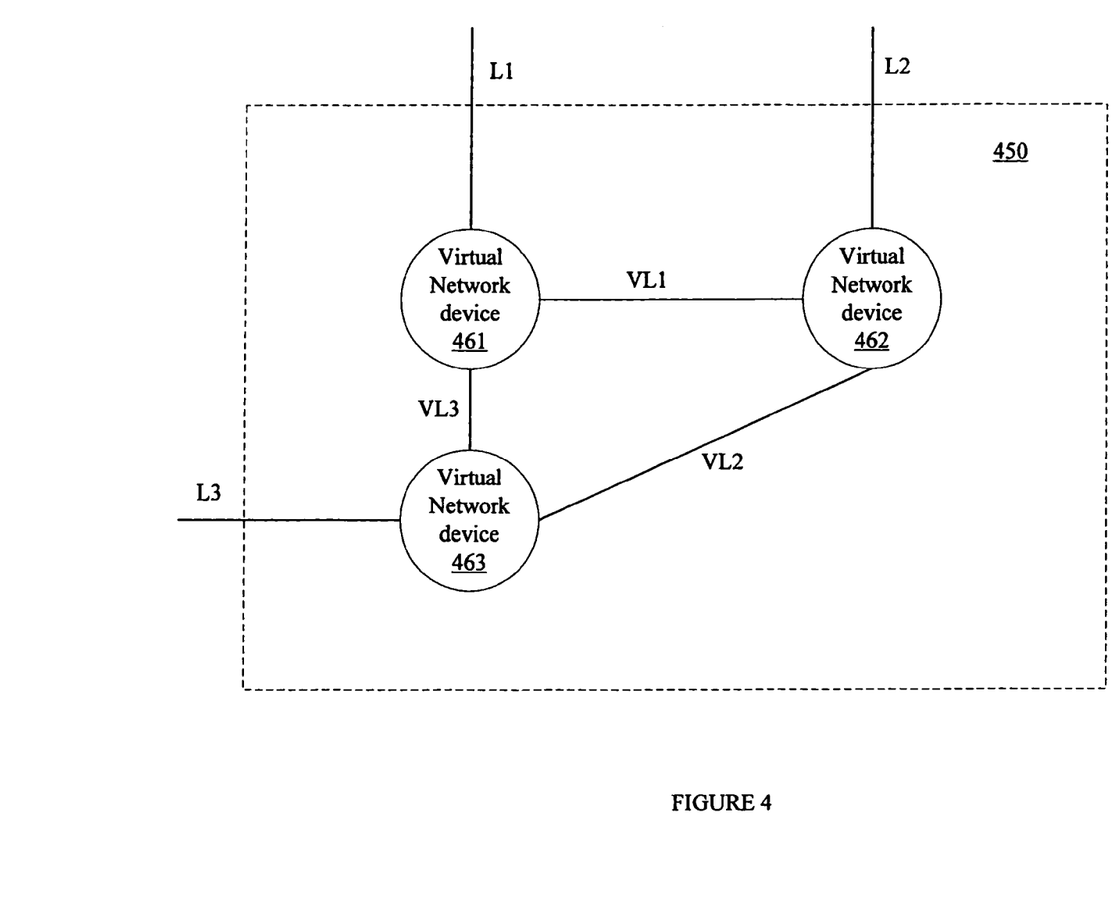
FIG. 4 shows a block diagram of a multi-domain computer system.

FIG. 4 shows a block diagram of multi-domain computer system 450. Components in multi-domain computer system 450 may operate in a similar manner to similarly-named components in multi-domain computer system 350, and may operate in a different manner in some ways. Multi-domain computer system 450 includes virtual network devices 461-463, and virtual interfaces VL1-VL3. Virtual network devices 461-463 and virtual interfaces VL1-VL3 may be created and operated in software such as multi-domain module 385 from FIG. 3.

Virtual interfaces (e.g. VL1-VL3) in multi-domain computer system 450 are virtual point-to-point links for communicating between the virtual network devices (e.g. 461-463) in multi-domain computer system 450. Each of the virtual network devices 461-463 may have an associated, unique routing instance. In one embodiment, virtual network device 461-463 are virtual routers. Also, one or more of virtual network devices 461-463 may include a firewall. Virtual network devices 461-463 may be separate and may operate independently from each other.

Additionally, communication between virtual network device 461-463 may be accomplished over virtual interfaces VL1-VL3 by employing network protocols, including but not limited to ARP, RARP, IP vX, and the like. One or more of virtual network devices 461-463 may also be associated with a physical interface, such as physical interfaces L1-L3. Transmission of packets over virtual interfaces (e.g. VL1-VL3) and over physical interfaces (e.g. L1-L3) may be accomplished in substantially the same way, and employing substantially the same protocols as a physical router. However, transmission of packets over virtual interfaces VL1-VL3 is accomplished in software, whereas transmission over packets over physical interfaces L1-L3 may be accomplished by employing physical adapters such as adapters 371-373 of FIG. 3.

The topology illustrated in FIG. 4, which employs point-to-point virtual interfaces, has limited scalability. An embodiment of a topology with improved scalability is illustrated in FIG. 5 below.

Figure 5:
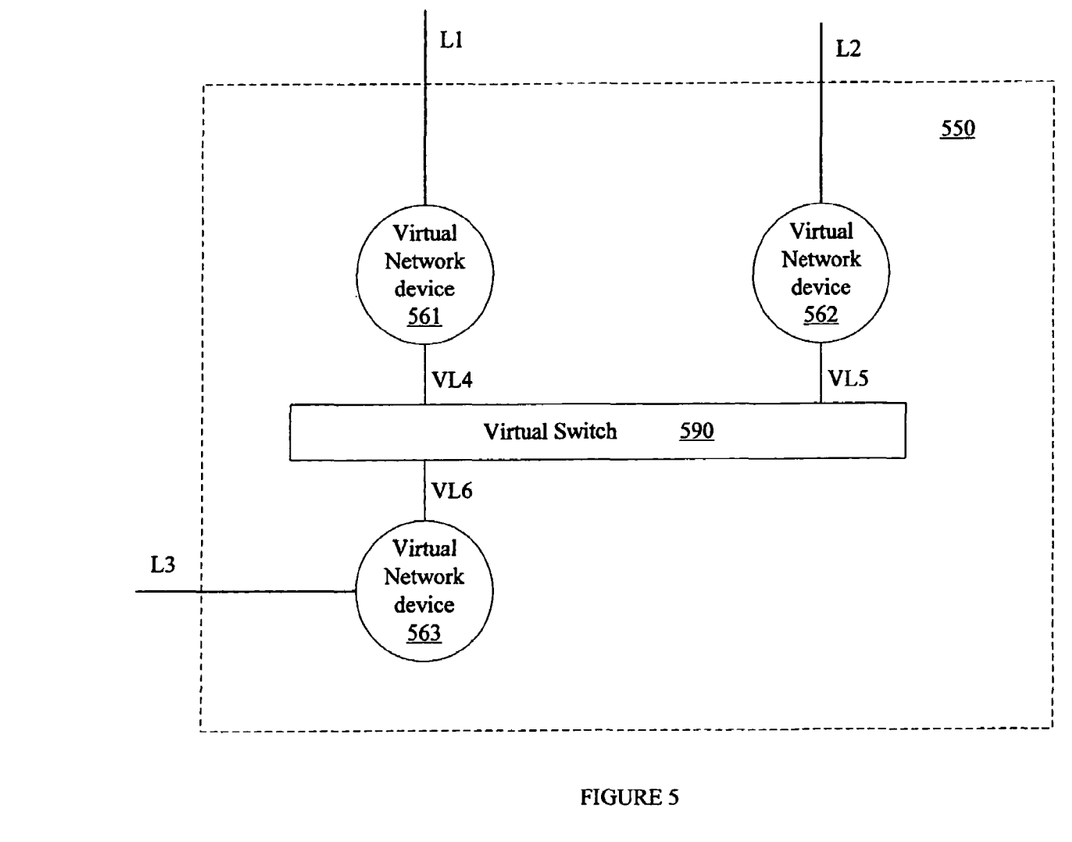
FIG. 5 illustrates a block diagram of another embodiment of a multi-domain computer system in which a virtual switch is employed, arranged in accordance with aspects of the present invention.

FIG. 5 illustrates a block diagram of an embodiment of multi-domain computer system 550. Components in multi-domain computer system 550 may operate in a similar manner to similarly-named components in multi-domain computer system 350 of FIG. 3, and may operate in a different manner in some ways. Multi-domain computer system 550 includes virtual network devices 561-563, virtual interfaces VL4-VL6, and virtual switch 590.

A processor (e.g. processor 380 of FIG. 3) in multi-domain computer system 550 may be configured to employ instructions (e.g. from multi-domain module 385 of FIG. 3) to create and control the operation of virtual network devices 561-563, virtual interfaces VL4-VL6, and virtual switch 590. In one embodiment, upon creation of a new virtual network device (e.g. virtual network device 563), an associated virtual interface (e.g. virtual interface VL6) is also created which is associated with the newly created virtual network device and with virtual switch 590.

Virtual network devices 561-563 are associated with virtual interfaces VL4-VL6, respectively. Virtual network devices 561-563 may also be associated with physical interfaces L1-L3, respectively. Virtual switch 590 is associated with virtual interfaces VL4-VL6. Virtual network devices 561-563 are substantially similar to virtual network devices 461-463 of FIG. 4, except that virtual network devices 561-563 are arranged for communication with virtual switch 590 by employing virtual interfaces VL4-VL6, respectively.

Further, virtual switch 590 may be configured to operate as a layer-2 switch, a layer-3 switch, and the like. In one embodiment, virtual switch 590 is configured to operate as a layer-2 switch that includes a neighbor cache table.

In this embodiment, virtual switch 590 may add an entry whenever a packet is received by virtual switch 590 from an interface (e.g. VL4, VL5, or VL6) that is associated with virtual switch 590. The entry may include an address field that indicates the source address of the received packet, and an interface field that indicates the interface from which the packet arrived. The entry may also include a time field that is associated with the time at which the packet was received. If a packet arrives on one of the interfaces associated with virtual switch 590, and the destination address of the packet is included in an address field in the neighbor cache table, then virtual switch 590 forwards the packet to the interface indicated in the interface field of that entry in the neighbor cache table. If the packet is forwarded from virtual switch 590 to a virtual interface, the processor transmits the packet to the virtual interface by employing instructions (e.g. in multi-domain module 385).

In one embodiment, for each virtual network device (e.g. 561-563), for the virtual interface that is associated with the virtual network device, the virtual network device includes a virtual adapter for the virtual interface. The virtual adapter includes a software module that may operate in substantially the same manner as an Ethernet driver on a physical router. In one embodiment, the virtual adapter has an associated IP address. Also, the virtual adapter may have an associated 48-bit physical address.

In one embodiment, the 48-bit physical address is an Ethernet address. In another embodiment, the physical address is a 48-bit Ethernet-like address that is substantially the same as an Ethernet address except that it is unique to multi-domain computer system 550 but need not be unique worldwide. In one embodiment, each of the virtual network devices in multi-domain computer system 550 includes a unique 32-bit domain identifier, in which the 32 least significant bits of the 48-bit physical address are the unique 32-bit domain identifier.

If the packet is sent from one of the virtual network devices to a virtual interface, the processor transmits the packet to the virtual interface by employing instructions (e.g. in multi-domain module 385). If one of the virtual network devices (e.g. 561-563) sends a packet to a physical interface, the processor (e.g. processor 360) enables the physical adapter that is associated with the physical link to transmit the packet to that physical interface based, in part, on a network protocol.

From the perspective of the upper layer protocols and the applications within each virtual network device (e.g. 561-563), there is connectivity to the other virtual network devices though virtual switch 590. Also, from the perspective of network devices outside of multi-domain computer system 550, the virtual network devices 561-563 and virtual switch 590 appear to be physical and separate devices.

In one embodiment, virtual switch 590 is a virtual VLAN-aware Ethernet switch. Ethernet frames may be employed for layer-2 packet transmission. Each Ethernet frame may use the Ethernet header format, including the format for VLAN. The header of each Ethernet frame includes destination, source, and protocol type. Use of VLAN enables groups of virtual devices to be logically grouped together as a VLAN. Virtual devices 461-463 may each belong to one or more VLANs. The logical VLAN association(s) may be defined explicitly by tagging, or may be implicitly defined through membership rules that are applied by virtual switch 590. Use of a VLAN-aware switch also allows a packet to be forwarded to a subset of virtual devices without broadcasting the packet to every device that is associated with virtual switch 590.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A network device for inter-domain communications, comprising:
    a transceiver that is configured to transmit and receive packets over a network based, in part, on a network protocol; and
    a processor that is configured to create a virtual switch that is configured to receive a packet at one of a plurality of interfaces associated with the virtual switch, wherein the plurality of interfaces includes a plurality of virtual interfaces, and wherein the virtual switch is configured to be associated with at least three virtual interfaces, and to provide the packet at another of the plurality of interfaces,
    wherein the virtual switch is configured to provide the packet at the other of the plurality of interfaces by determining if a destination address for the packet is included in a neighbor cache table that is associated with the virtual switch, and
    wherein the virtual switch is further configured to add an entry to a neighbor cache table such that the entry includes a source address of the packet, and further includes the one of the plurality of interfaces that received the packet.

2. The network device of claim 1, wherein the processor is further configured to create a plurality of virtual network devices, wherein each of the plurality of virtual network devices is configured to receive and send received packets to a separate one of the plurality of virtual interfaces, based, in part, on the network protocol.

3. The network device of claim 2, wherein each of the plurality of virtual network devices has a unique physical address.

4. The network device of claim 3, wherein each of the unique physical addresses is a 48-bit Ethernet-like address.

5. The network device of claim 2, wherein the network protocol includes at least one of an Internet protocol and an address resolution protocol.

6. The network device of claim 2, wherein each of the plurality of virtual network devices is a virtual router.

7. The network device of claim 2, wherein at least one of the plurality of virtual network devices includes a firewall.

8. The network device of claim 1, wherein the virtual switch is a virtual layer-2 switch.

9. The network device of claim 1, wherein the virtual switch is a virtual VLAN-aware Ethernet switch.

10. The network device of claim 1, wherein the virtual switch is configured to provide the packet at the other of the plurality of interfaces by performing actions, including:
    determining if a destination address for the packet is included in the neighbor cache table that is associated with the virtual switch; and
    if the destination address for the packet is included in the neighbor cache table, providing the packet at a one of the plurality of interfaces indicated for the destination address in the neighbor cache table.

11. A computer program for inter-domain communications embodied on a computer-readable storage medium, comprising components that are configured to enable actions to be performed, including:
    configuring a processor to create a virtual switch that is configured to be associated with at least one of a plurality of interfaces that includes at least three virtual interfaces; and
    if a packet is received by the virtual switch at one of the plurality of interfaces, employing the virtual switch to provide the packet to another of the plurality of interfaces,
    wherein the virtual switch is configured to provide the packet at the other of the plurality of interfaces by determining if a destination address for the packet is included in a neighbor cache table that is associated with the virtual switch, and
    wherein the virtual switch is further configured to add an entry to a neighbor cache table such that the entry includes a source address of the packet, and further includes the one of the plurality of interfaces that received the packet.

12. The computer program of claim 11, further comprising:
    creating a plurality of virtual network devices and the plurality of virtual interfaces, wherein each of the virtual network devices is associated with a separate one of the plurality of virtual interfaces, and wherein at least one of the plurality of virtual network devices is associated with a physical interface; and
    for each of the plurality of virtual network devices, if a packet is received at the physical interface that is associated with the virtual network device, providing the packet to another interface that is associated with the virtual network device based, in part, on a network protocol.

13. The computer program of claim 12, further comprising:
    for each of the plurality of virtual network devices, if a packet is received, from the virtual switch, at the one of the plurality of virtual interfaces that is associated with the virtual network device, providing the packet to yet another interface that is associated with the virtual network device based, in part, on the network protocol; and
    if the virtual network device provides the packet to the physical interface that is associated with the virtual network device, enabling the packet to be transmitted to the network, based, in part, on the network protocol.

14. The computer program of claim 12, wherein the network protocol includes at least one of an Internet protocol and an address resolution protocol.

15. The computer program of claim 12, wherein each of the plurality of virtual network devices has a unique physical address, wherein each of the unique physical addresses is a 48-bit Ethernet-like address.

16. The computer program of claim 11, wherein the virtual switch is a virtual layer-2 switch.

17. The computer program of claim 11, wherein the virtual switch is a virtual VLAN-aware Ethernet switch.

18. The computer program of claim 11, wherein employing the virtual switch to provide the packet at the other of the plurality of interfaces is accomplished by performing actions, including:
  determining if a destination address for the packet is included in the neighbor cache table that is associated with the virtual switch;
  if the destination address for the packet is included in the neighbor cache table, providing the packet at a one of the plurality of virtual interfaces indicated for the destination address in the neighbor cache table.

19. An apparatus for inter-domain communications, comprising:

creating means for creating a virtual switch that is configured to be associated with a plurality of interfaces that include a plurality of at least three virtual interfaces; and employing means for, if a packet is received by the virtual switch at one of the plurality of interfaces, employing the virtual switch to provide the packet to another of the plurality of interfaces, wherein the virtual switch is configured to provide the packet at the other of the plurality of interfaces by determining if a destination address for the packet is included in a neighbor cache table that is associated with the virtual switch, and wherein the virtual switch is further configured to add an entry to a neighbor cache table such that the entry includes a source address of the packet, and further includes the one of the plurality of interfaces that received the packet.

* * * * *